United States Patent
Zhao (10) Patent No.: US 9,851,851 B2
(45) Date of Patent: Dec. 26, 2017

(54) TOUCH DISPLAY APPARATUS HAVING MULTIPLEXING FUNCTION OF DATA LINES AND DRIVING METHOD THEREOF

(71) Applicant: BOE TECHNOLOGY GROUP CO., LTD., Beijing (CN)

(72) Inventor: Jiayang Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 79 days.

(21) Appl. No.: 14/342,220

(22) PCT Filed: May 22, 2013

(86) PCT No.: PCT/CN2013/076098
§ 371 (c)(1),
(2) Date: Feb. 28, 2014

(87) PCT Pub. No.: WO2014/153825
PCT Pub. Date: Oct. 2, 2014

(65) Prior Publication Data
US 2015/0049050 A1    Feb. 19, 2015

(30) Foreign Application Priority Data
Mar. 29, 2013 (CN) .......................... 2013 1 0109793

(51) Int. Cl.
G06F 3/045 (2006.01)
G06F 3/044 (2006.01)
G06F 3/041 (2006.01)

(52) U.S. Cl.
CPC ............ *G06F 3/044* (2013.01); *G06F 3/0416* (2013.01)

(58) Field of Classification Search
CPC ............................... G06F 3/0412; G06F 3/044
(Continued)

(56) References Cited

U.S. PATENT DOCUMENTS

2010/0060600 A1    3/2010  Wang et al.
2010/0194695 A1*   8/2010  Hotelling ............... G06F 3/044
                                                    345/173
(Continued)

FOREIGN PATENT DOCUMENTS

CN    101666931 A    3/2010
CN    102376286 A    3/2012
(Continued)

OTHER PUBLICATIONS

International Search Report dated Jan. 9, 2014; Appln No. PCT/CN2013/076098.
(Continued)

*Primary Examiner* — Adam J Snyder
(74) *Attorney, Agent, or Firm* — Ladas & Parry LLP (57) ABSTRACT

Provided a touch display apparatus and a driving method thereof, and the touch display apparatus comprising: a plurality of gate lines, a plurality of data lines, pixel electrodes and thin film transistors, wherein the touch display apparatus further includes a plurality of first common electrodes, the plurality of first common electrodes are disposed to be intersected and insulated with the plurality of data lines, and are used for receiving a touch detection driving signal to form touch driving electrodes at a first moment, and for receiving a display driving signal at a second moment; the plurality of data lines are combined as sensing electrodes so as to form a mutual-capacitance structure with the touch driving electrodes, at the first moment; and the pixel electrode is used for receiving a pixel signal so as to display in cooperation with the first common electrodes, at the second moment.

14 Claims, 5 Drawing Sheets

(58) Field of Classification Search
USPC .................................... 345/174; 178/18.06
See application file for complete search history.

(56) References Cited

U.S. PATENT DOCUMENTS

| | | | |
|---|---|---|---|
| 2010/0194698 A1* | 8/2010 | Hotelling ................ | G06F 3/044 345/173 |
| 2011/0050585 A1* | 3/2011 | Hotelling et al. ............ | 345/173 |
| 2012/0044167 A1 | 2/2012 | Nakanishi et al. | |
| 2012/0154326 A1 | 6/2012 | Liu | |
| 2013/0033439 A1 | 2/2013 | Kim et al. | |
| 2014/0062943 A1* | 3/2014 | Choi et al. .................... | 345/174 |
| 2014/0071066 A1* | 3/2014 | Lee ........................ | G06F 3/044 345/173 |

FOREIGN PATENT DOCUMENTS

| | | |
|---|---|---|
| CN | 102914893 A | 2/2013 |
| CN | 102609128 A | 7/2013 |
| CN | 203149528 U | 8/2013 |

OTHER PUBLICATIONS

First Chinese Office Action dated May 29, 2015; Appln. No. 201310109793.6.
Second Chinese Office Action dated Nov. 30, 2015; Appln. No. 201310109793.6.
International Preliminary Report on Patentability Appln. No. PCT/CN2013/076098; dated Sep. 29, 2015.
Third Chinese Office Action dated Jun. 12, 2016; Appln. No. 201310109793.6.

\* cited by examiner

TOUCH DISPLAY APPARATUS HAVING MULTIPLEXING FUNCTION OF DATA LINES AND DRIVING METHOD THEREOF

TECHNICAL FIELD

The present invention relates to a field of touch panel, and particularly, to a touch display apparatus and driving method thereof.

BACKGROUND

As an input media, a touch panel (TP) is integrated together with a display panel as a touch screen. The touch panel is able to work importantly in a field of display.

Particularly, a capacitance touch panel has got a lot of attention at present because of its high sensitivity. A mutual-capacitance touch panel is favored in people relying on its advantages such as high sensitivity and a multi touch. The capacitance touch panel comprises an out-cell touch panel and an in-cell touch panel. The in-cell touch panel is a touch panel integrating the TP into a Liquid Crystal Display (LCD) panel. The in-cell touch panel has become a research focus by people because it has a low manufacture cost, a good light transmittance, a thin thickness of array, etc.

Figure 1:
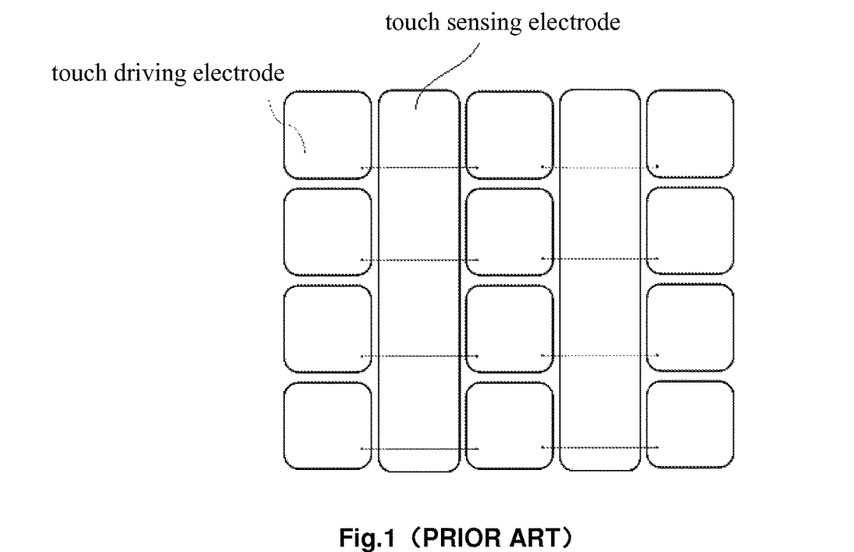
FIG. 1 is an exemplary view illustrating a structure of an existing touch panel.

A basic operation principle of the mutual-capacitance touch panel would be discussed below. FIG. 1 is an exemplary view illustrating a structure of an existing touch panel. A touch driving electrode of the mutual-capacitance touch panel decides an X-direction coordinate of a touch point, and a touch sensing electrode decides a Y-direction coordinate of the touch point. A touch driving voltage is applied at the touch driving electrode side, and a constant voltage is applied at the touch sensing electrode. When the touch point is detected, the touch driving electrodes in the X-direction are scanned progressively, and signals on each row of the touch sensing electrodes are read when each row of the touch driving electrodes are scanned. Intersections among the each row and each column can be scanned by one round of scanning, and total X*Y signals are scanned. Such touch positioning detection manner may determine coordinates of a plurality of points exactly, therefore it may realize a multi touch.

When a finger touches the touch panel, a part of current in a circuit may flow into the finger, which is equivalent to a change of a value of the mutual-capacitance between the touch driving electrode and the touch sensing electrode, and a slight change in the current caused by the mutual-capacitance may be detected at a touch point detection circuit end. Because both of the touch driving electrodes and the touch sensing electrodes are disposed in the liquid crystal display panel, a distance between the TP structure and the common electrode of the LCD is small, and a parasitic capacitance between the touch driving electrode/touch sensing electrode and the common electrode is very huge, such that a noise in the LCD has a great effect on the TP; therefore the current signal detected by the touch point detection circuit is almost annihilated into the noise, thus a touch effect is very poor, which may even lead to the touch panel unable to operate normally.

Furthermore, although some of the existing touch panels multiplex electrode lines which have existed on the LCD, for example, the common electrode lines or the gate lines, a resistance would be large when the sensing electrodes utilize each electrode line, which causes a low sensitivity of the touch.

SUMMARY

In order to solve a problem of low touch sensitivity in the existing touch panel, embodiments of the present disclosure provide a touch display apparatus and a driving method thereof.

The embodiments of the present disclosure provide a technical solution of: a touch display apparatus comprising: a plurality of gate lines, a plurality of data lines, pixel electrodes and thin film transistors, and further comprising a plurality of first common electrodes, wherein the plurality of first common electrodes are disposed to be intersected and insulated with the plurality of data lines, and are used for receiving a touch detection driving signal to form touch driving electrodes at a first moment, and for receiving a display driving signal at a second moment;

the plurality of data lines are combined as sensing electrodes so as to form a mutual-capacitance structure with the touch driving electrodes, at the first moment; and the pixel electrode is used for receiving a pixel signal so as to display in cooperation with the first common electrodes, at the second moment.

The embodiments of the present disclosure further provide a driving method for a touch display apparatus, comprising:

at a first moment, combining a plurality of data lines as a plurality of sensing electrodes, and applying a touch detection driving signal to first common electrodes, in order to perform a touch operation based on the touch detection driving signal; and at a second moment, applying a display driving signal to the first common electrodes, and applying a pixel signal to pixel electrodes, in order to perform a display based on the display driving signal and the pixel signal.

The touch display apparatus according to the embodiments of the present disclosure may multiplex the electrode lines which have been existed on a display panel, combine the data lines as the plurality of sensing electrodes at the first moment of a touch stage, and apply the touch detection driving signal to the driving electrodes so as to form the mutual-capacitance structure with the sensing electrodes. The sensitivity of the touch detection is high because the sensing electrodes are formed by the combination of the plurality of data line.

DETAILED DESCRIPTION

Detailed embodiments of the present disclosure may be described in details below in connection with drawings, in order to make technical problem to be settled, solutions and advantages of the embodiments of the present disclosure be clearer.

A touch display apparatus according to the embodiments of the present disclosure comprises: a plurality of gate lines, a plurality of data lines, pixel electrodes and thin film transistors, and further comprises a plurality of first common electrodes, wherein the plurality of first common electrodes are disposed to be intersected and insulated with the plurality of data lines, and are used for receiving a touch detection driving signal to form touch driving electrodes at a first moment, and for receiving a display driving signal at a second moment;

the plurality of data lines are combined as sensing electrodes so as to form a mutual-capacitance structure with the touch driving electrodes, at the first moment; and the pixel electrode is used for receiving a pixel signal so as to display in cooperation with the first common electrodes, at the second moment.

The touch display apparatus according to the embodiments of the present disclosure may multiplex the electrode lines which have been existed on a display panel, combine the data lines as the plurality of sensing electrodes in a touch stage, and apply the touch detection driving signal to the common electrodes, as the touch driving electrodes, so as to form the mutual-capacitance structure with the sensing electrodes. The sensitivity of the touch detection is high because the sensing electrodes are formed by the combination of the plurality of data line.

Figure 2:
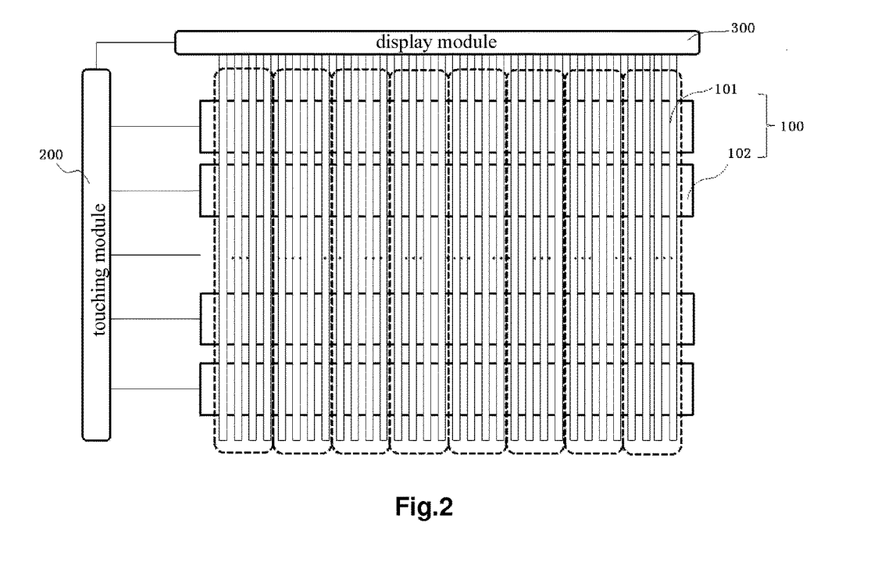
FIG. 2 is an exemplary view illustrating a structure according to an embodiment of the present disclosure.

FIG. 2 is an exemplary view illustrating a structure according to an embodiment of the present disclosure. This touch display apparatus is substantively same as the first embodiment, and differences are in that it further comprises:

a touching module 200 for applying the touch detection driving signal to the first common electrodes at the first moment; and a display module 300 for applying the display driving signal to the first common electrodes and applying the pixel signal to the pixel electrode at the second moment.

The touch display apparatus according to the embodiment of the present disclosure multiplexes the electrode lines on the display panel 100 which comprises the plurality of gate lines, the plurality of data lines 101, the first common electrode 102, the pixel electrode and the thin film transistor, the gate lines and the data lines are intersected and formed on a substrate, and the pixel electrode and the thin film transistor as a switch for the pixel electrode are disposed in a pixel cell defined by the data line and the gate line. The data lines 101 and the gate lines are disposed to be insulated and intersected with each other, preferably, they are disposed to be insulated and intersected vertically with each other. The first common electrode 102 and the data line are disposed to be insulated and intersected with each other, preferably, they are disposed to be insulated and intersected vertically with each other. The plurality of data lines are combined as a plurality of sub sensing electrodes so as to form the mutual-capacitance structure with the touch driving electrodes at the first moment. The touching module 200 is used for applying the touch detection driving signal to the first common electrodes to realize a touch operation at the first moment. The display module 300 is used for applying the display driving signal to the first common electrodes and applying the pixel signal to the pixel electrode to perform a display operation.

The sensing electrodes at the first moment according to the embodiments of the present disclosure may be formed by a combination of the plurality of data lines, or may be formed by second common electrodes disposed in parallel with the plurality of data lines, or may be formed by both of them, and the sensing electrode forms the mutual-capacitance structure with the touch driving electrode so as to realize the touch operation at the first moment. In one embodiment of the present disclosure, the combining the plurality of data lines as the plurality of sub sensing electrodes comprises selecting several data lines, which are adjacent to each other or not, to form one sub sensing electrode. Preferably, numbers of the selected data lines in the sub sensing electrodes are equal. In the embodiments shown in FIG. 2, the data lines with equal number of 4 are selected for each of the sub sensing electrodes. Of course of the data lines with any other number may be selected depending on requirements. Further, the adjacent sub sensing electrodes may be spaced by one or more dummy data lines, and a gap may be disposed between the adjacent sub sensing electrodes so as to achieve a better touch effect and touch precision.

Figure 3:
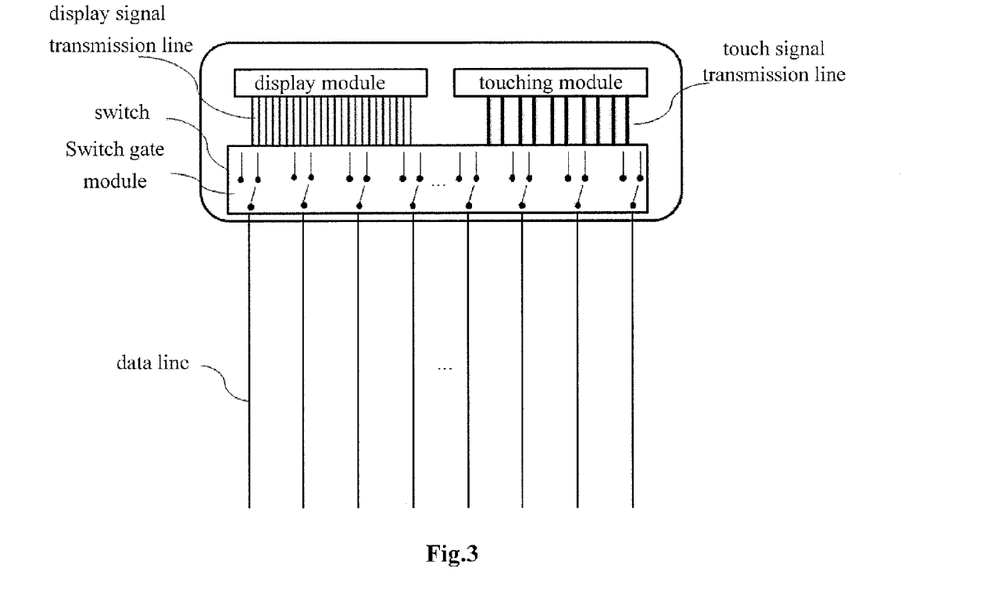
FIG. 3 is a diagram illustrating a connection structure of data lines according to an embodiment of the present disclosure.

FIG. 3 is a diagram illustrating a connection structure of data lines according to an embodiment of the present disclosure. The touch display apparatus according to the embodiment of the present disclosure further comprises a switch(es) for controlling to connect the data lines to the touching module at the first moment and connect the data lines to the display module at the second module, thus realizing operation states of the data lines at the different moments. The switch may be a bi-direction switch or any other switch having a selection function. The touching module and the display module are needed to be integrated together, and the connection of the data lines is allocated by a switch gate circuit, in order to achieve a multiplexing function of the data lines and prevent display signals from being interfered with the touches.

Figure 4:
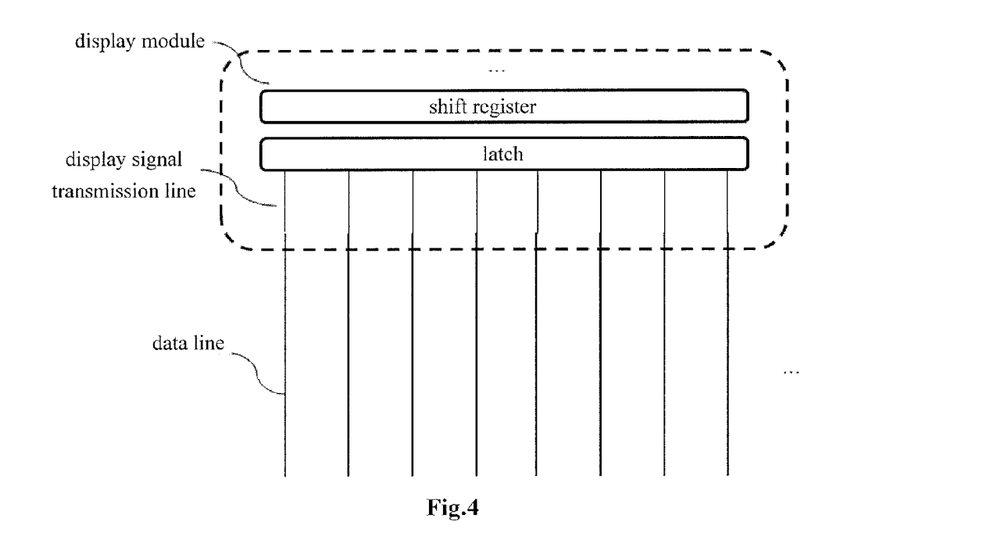
FIG. 4 is a diagram illustrating a connection structure of the data lines performing a display operation according to an embodiment of the present disclosure.

FIG. 4 is a diagram illustrating a connection structure of the data lines performing a display operation according to an embodiment of the present disclosure. The touch display apparatus according to the embodiment of the present disclosure performs the display by connecting the display module with the data lines via the switches. The display module according to the embodiment of the present disclosure provides a data signal to the data lines through a shift register and a latch, and its display operation is same as a process of display in a general panel.

Figure 5:
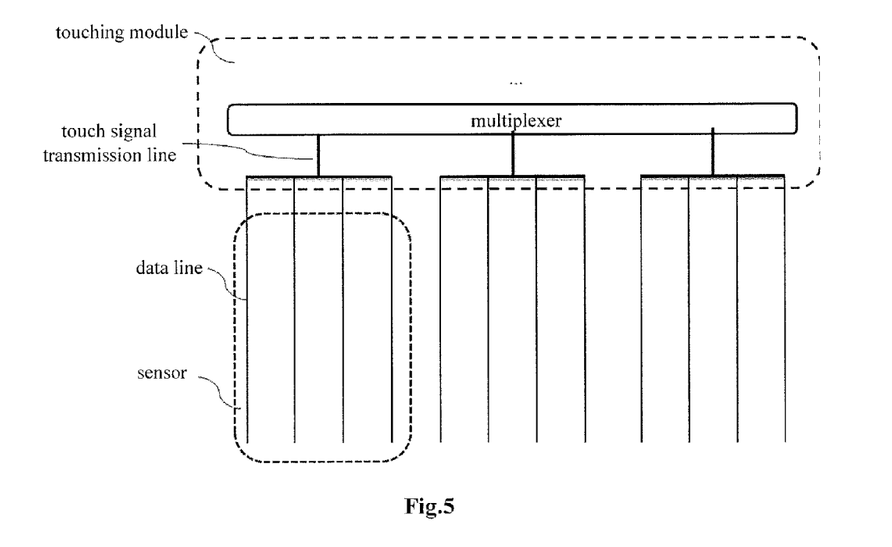
FIG. 5 is a diagram illustrating a connection structure of the data lines performing a touch operation according to an embodiment of the present disclosure.

FIG. 5 is a diagram illustrating a connection structure of the data lines performing a touch operation according to an embodiment of the present disclosure. In this embodiment, the data lines are combined as the plurality of sub sensing electrodes, and the touching module is connected to the sub sensing electrodes through the switches so as to realize the touch operation. The touching module may be a multiplexer, and the sensing electrodes outputs a sensing signal to the touching module when performing a touch sensing in order to determine a touch position.

The touch display apparatus according to the embodiments of the present disclosure may further comprise a detection module for determining a touch position according to a capacitance formed between the touch driving electrode and the sensing electrode. In details, a value of a sensing current is measured, and the position of a touch point on the electrode line may be determined according to a correspondence relationship between current values recorded in advance and coordinates. At the same time, an exact position of the touch point occurred on a certain electrode line may be acquired by referring to a recorded position information of the electrode line.

Figure 6:
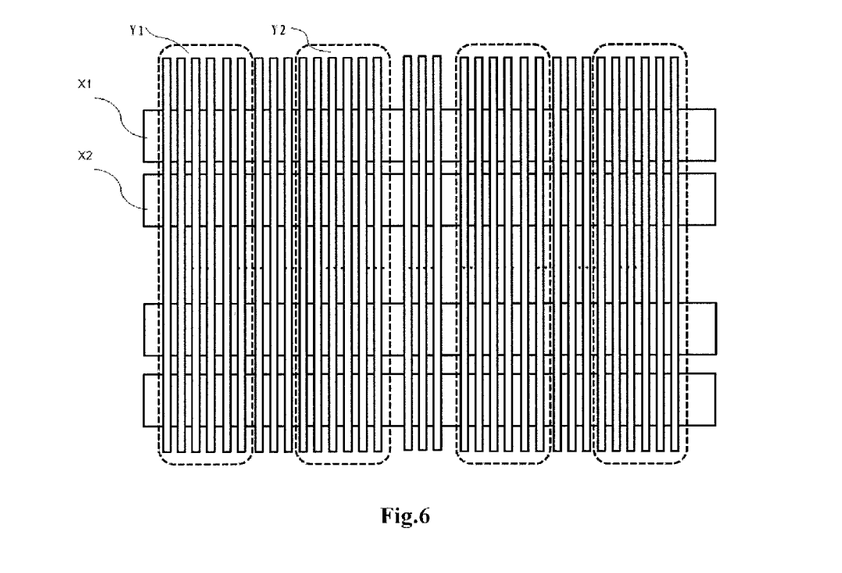
FIG. 6 is an exemplary view illustrating a structure of a touch sensor according to an embodiment of the present disclosure.
Figure 7:
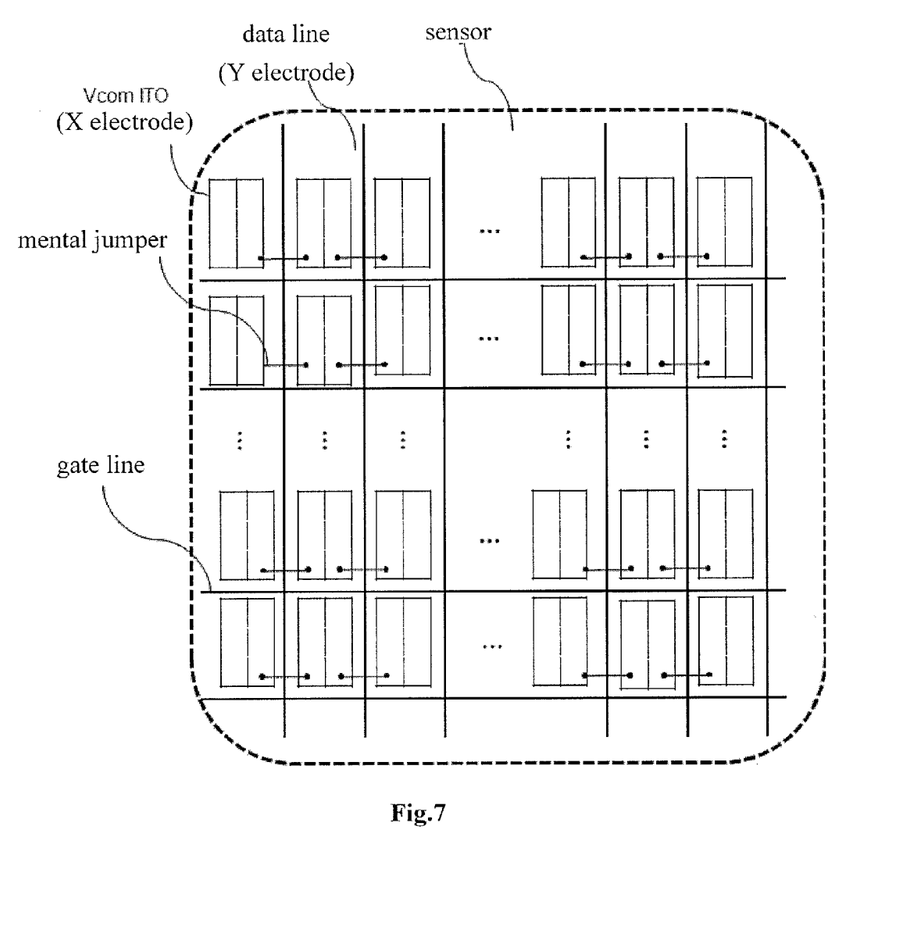
FIG. 7 is a diagram illustrating a detailed structure of FIG. 6.
Figure 8:
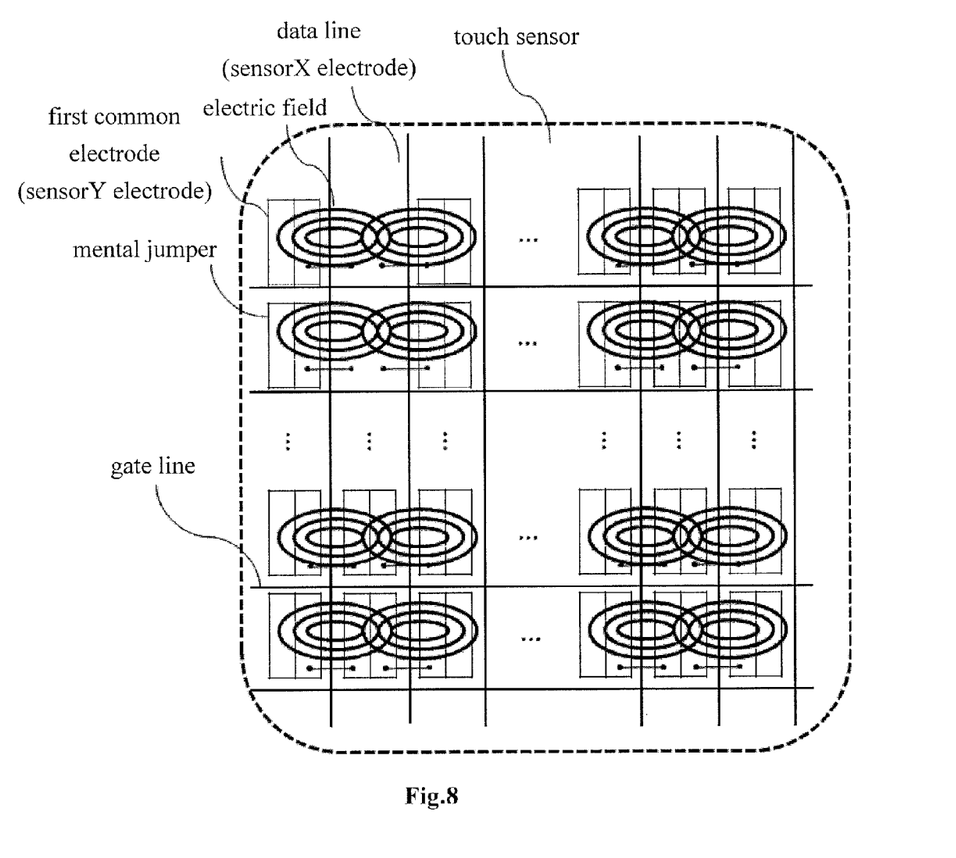
FIG. 8 is a diagram illustrating an electric field of FIG. 6.

FIG. 6 is an exemplary view illustrating a structure of a touch sensor according to an embodiment of the present disclosure. The touch driving electrodes of the touch display apparatus are the common electrodes and comprise the common electrodes X1, X2 in a horizontal direction, and the sensing electrodes are composed of the plurality of data lines and form the sub sensing electrodes of sub sensing electrode Y1, Y2, and the like, respectively. FIG. 7 is a diagram illustrating a detailed structure of the touch sensor, wherein the common electrode is formed by a transparent conductive film ITO. FIG. 8 is a diagram illustrating an electric field formed in the touch panel of FIG. 6.

The embodiments of the present disclosure further provide a driving method for a touch display apparatus, comprising:

at a first moment, combining a plurality of data lines as a plurality of sensing electrodes, and applying a touch detection driving signal to first common electrodes, in order to perform a touch operation based on the touch detection driving signal; and at a second moment, applying a display driving signal to the first common electrodes, and applying a pixel signal to pixel electrodes, in order to perform a display based on the display driving signal and the pixel signal.

The combining the plurality of data lines as the plurality of sub sensing electrodes comprises selecting several data lines, which are adjacent to each other or not, to form one sub sensing electrode. In an example, numbers of the selected data lines in the sub sensing electrodes according to the embodiments of the present disclosure are equal, in order to form the mutual-capacitance structure with the touch driving electrodes.

The above solutions have effects as follows: the touch panel according to the embodiments of the present disclosure may multiplex the electrode lines which have been existed on a display panel, combine the data lines as the plurality of sensing electrodes at the first moment of the touch stage, and apply the touch detection driving signal to the driving electrodes so as to form the mutual-capacitance structure with the sensing electrodes, in order to detect the touch position. The sensitivity of the touch detection is high because the sensing electrodes are formed by the combination of the plurality of data line.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A touch display apparatus comprising: a plurality of gate lines, a plurality of data lines, pixel electrodes and thin film transistors, wherein the touch display apparatus further comprises a plurality of first common electrodes, the plurality of first common electrodes are disposed to be intersected and insulated with the plurality of data lines, and are used for receiving a touch detection driving signal to form touch driving electrodes at a first moment, and for receiving a display driving signal at a second moment;

the plurality of data lines are combined so as to be multiplexed as sensing electrodes so as to form a mutual-capacitance structure with the touch driving electrodes, at the first moment; and the pixel electrodes is used for receiving a pixel signal so as to display in cooperation with the first common electrodes, at the second moment, wherein the touch display apparatus at the first moment further comprise second sensing electrodes which are formed by second common electrodes disposed in parallel with the plurality of data lines, during the first moment, the plurality of data lines and the second common electrodes are not connected to each other, and the sensing electrodes formed by the plurality of data lines and the second sensing electrodes formed by the second common electrodes sense the touch signals separately.

2. The touch display apparatus of claim 1, wherein the touch display apparatus further comprises:

a touching module for applying the touch detection driving signal to the first common electrodes at the first moment; and a display module for applying the display driving signal to the first common electrodes and applying the pixel signal to the pixel electrodes at the second moment.

3. The touch display apparatus of claim 1, wherein the sensing electrodes at the first moment comprise a plurality of sub sensing electrodes, and wherein the plurality of sub sensing electrodes comprise several data lines which are adjacent to each other or not.

4. The touch display apparatus of claim 3, wherein numbers of the data lines included in the adjacent sub sensing electrodes are equal.

5. The touch display apparatus of claim 1, wherein the touch display apparatus further comprises a switch for controlling to connect the data lines to the touching module at the first moment and connect the data lines to the display module at the second moment.

6. The touch display apparatus of claim 1, wherein the touch display apparatus further comprises a detection module for determining a touch position according to a capacitance formed between the touch driving electrode and the sensing electrode.

7. A driving method for the touch display apparatus, comprising:

at a first moment, combining a plurality of data lines so as to be multiplexed as a plurality of sensing electrodes, and applying a touch detection driving signal to first common electrodes, in order to perform a touch operation based on the touch detection driving signal; and at a second moment, applying a display driving signal to the first common electrodes, and applying a pixel signal to pixel electrodes, in order to perform a display based on the display driving signal and the pixel signal, wherein the touch display apparatus comprises:

a plurality of gate lines, a plurality of data lines, pixel electrodes and thin film transistors, wherein the touch display apparatus further comprises a plurality of first common electrodes, the plurality of first common electrodes are disposed to be intersected and insulated with the plurality of data lines, and are used for receiving a touch detection driving signal to form touch driving electrodes at a first moment, and for receiving a display driving signal at a second moment;

the plurality of data lines are combined as sensing electrodes so as to form a mutual-capacitance structure with the touch driving electrodes, at the first moment; and the pixel electrodes is used for receiving a pixel signal so as to display in cooperation with the first common electrodes, at the second moment, wherein the touch display apparatus at the first moment further comprise second sensing electrodes which are formed by second common electrodes disposed in parallel with the plurality of data lines, during the first moment, the plurality of data lines and the second common electrodes are not connected to each other and the sensing electrodes formed by the plurality of data lines and the second sensing electrodes formed by the second common electrodes sense the touch signals separately.

8. The driving method for the touch display apparatus of claim 7, wherein the touch display apparatus further comprises:

a touching module for applying the touch detection driving signal to the first common electrodes at the first moment; and a display module for applying the display driving signal to the first common electrodes and applying the pixel signal to the pixel electrodes at the second moment.

9. The driving method for the touch display apparatus of claim 7, wherein the sensing electrodes at the first moment comprise a plurality of sub sensing electrodes, and wherein the plurality of sub sensing electrodes comprise several data lines which are adjacent to each other or not.

10. The driving method for the touch display apparatus of claim 9, wherein numbers of the data lines included in the adjacent sub sensing electrodes are equal.

11. The driving method for the touch display apparatus of claim 7, wherein the touch display apparatus further comprises a switch for controlling to connect the data lines to the touching module at the first moment and connect the data lines to the display module at the second moment.

12. The driving method for the touch display apparatus of claim 11, comprising:

at a first moment, combining a plurality of data lines as a plurality of sensing electrodes, and applying a touch detection driving signal to first common electrodes, in order to perform a touch operation based on the touch detection driving signal; and at a second moment, applying a display driving signal to the first common electrodes, and applying a pixel signal to pixel electrodes, in order to perform a display based on the display driving signal and the pixel signal.

13. The driving method for the touch display apparatus of claim 7, wherein the touch display apparatus further comprises a detection module for determining a touch position according to a capacitance formed between the touch driving electrode and the sensing electrode.

14. A driving method for the touch display apparatus of claim 13, comprising:

at a first moment, combining a plurality of data lines as a plurality of sensing electrodes, and applying a touch detection driving signal to first common electrodes, in order to perform a touch operation based on the touch detection driving signal; and at a second moment, applying a display driving signal to the first common electrodes, and applying a pixel signal to pixel electrodes, in order to perform a display based on the display driving signal and the pixel signal.

* * * * *